(12) United States Patent
Di Santo et al.

(10) Patent No.: US 12,422,588 B2
(45) Date of Patent: Sep. 23, 2025

(54) FORMATION POROSITY ESTIMATION FROM DIGITAL IMAGES

(71) Applicant: SCHLUMBERGER TECHNOLOGY CORPORATION, Sugar Land, TX (US)

(72) Inventors: Simone Di Santo, Dhahran (SA); Tetsushi Yamada, Cambridge, MA (US); Ilaria De Santo, Paris (FR); Karim Bondabou, Clamart (FR); Wael Abdallah, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/997,462

(22) PCT Filed: Jul. 21, 2023

(86) PCT No.: PCT/US2023/070658
§ 371 (c)(1),
(2) Date: Jan. 21, 2025

(87) PCT Pub. No.: WO2024/020523
PCT Pub. Date: Jan. 25, 2024

(65) Prior Publication Data
US 2025/0258316 A1 Aug. 14, 2025

Related U.S. Application Data

(60) Provisional application No. 63/379,941, filed on Oct. 18, 2022, provisional application No. 63/369,028, filed on Jul. 21, 2022.

(51) Int. Cl.
*G06K 9/00* (2022.01)
*E21B 49/00* (2006.01)
(Continued)

(52) U.S. Cl.
CPC ............ *G01V 20/00* (2024.01); *E21B 49/005* (2013.01); *G01N 15/08* (2013.01); *G01N 15/088* (2013.01);
(Continued)

(58) Field of Classification Search
CPC ........ G06V 10/22; G06V 10/25; G06V 10/26; G06V 10/40; G06V 10/44; G06V 10/46;
(Continued)

(56) References Cited

U.S. PATENT DOCUMENTS 1,179,089 A 4/1916 Gibson
7,936,374 B2 5/2011 Cutler
(Continued)

FOREIGN PATENT DOCUMENTS

CN 111141698 A 5/2020
EP 3896496 A1 10/2021
(Continued)

OTHER PUBLICATIONS

Abbireddy, C.O.R. et al., "A method of estimating the form of fine particulates", Geotechnique 2009, 59(6), pp. 503-511.
(Continued)

*Primary Examiner* — Eric Rush
(74) *Attorney, Agent, or Firm* — Jeffrey D Frantz (57) ABSTRACT

A method for estimating a porosity of a rock sample includes acquiring a calibrated digital image of the rock sample, extracting color and texture features from the digital image of the rock sample, and estimating the porosity of the rock sample using a model to evaluate the extracted color features and texture features. The model is configured to correlate digital image color and texture features with porosity.

17 Claims, 6 Drawing Sheets

(51) Int. Cl.
| | |
|---|---|
| *G01N 15/08* | (2006.01) |
| *G01N 15/10* | (2006.01) |
| *G01V 20/00* | (2024.01) |
| *G06T 7/10* | (2017.01) |
| *G06T 7/40* | (2017.01) |
| *G06V 10/26* | (2022.01) |
| *G06V 10/40* | (2022.01) |
| *G06V 10/54* | (2022.01) |
| *G06V 10/56* | (2022.01) |
| *G06V 10/70* | (2022.01) |
| *G06V 10/762* | (2022.01) |
| *G06V 10/764* | (2022.01) |
| *G06V 10/77* | (2022.01) |
| *G06V 10/771* | (2022.01) |

(52) U.S. Cl.
CPC .......... *G01N 15/1012* (2013.01); *G06T 7/10* (2017.01); *G06T 7/40* (2013.01); *G06V 10/26* (2022.01); *G06V 10/40* (2022.01); *G06V 10/54* (2022.01); *G06V 10/56* (2022.01); *G06V 10/70* (2022.01); *G06V 10/762* (2022.01); *G06V 10/764* (2022.01); *G06V 10/77* (2022.01); *G06V 10/771* (2022.01)

(58) Field of Classification Search
CPC ........ G06V 10/48; G06V 10/54; G06V 10/56; G06V 10/58; G06V 10/70; G06V 10/761; G06V 10/762; G06V 10/764; G06V 10/766; G06V 10/77; G06V 10/771; G06V 10/7715; G06V 10/82; G06V 20/10; G06V 20/69; G06V 20/695; G06V 20/70; G01V 8/00; G01V 20/00; G06T 7/00; G06T 7/0002; G06T 7/10; G06T 7/40; G06T 7/90; G06T 2207/20081; G06T 2207/20084; G06T 2207/30181; G01N 15/00; G01N 15/08; G01N 15/088; G01N 15/10; G01N 15/1012; G01N 15/14; G01N 15/1433; G01N 15/1468; G01N 2015/03; G01N 2015/0833; G01N 2015/0846; G01N 2015/1014; G01N 2015/1472; G01N 2015/1488; E21B 49/005
USPC ....... 382/100, 103, 108, 109, 141, 155–157, 382/159, 160, 162, 165, 173, 181, 190, 382/191, 195, 206, 224–228, 282, 286, 382/291, 325; 175/5, 24, 40, 46, 50, 175/57–60; 702/1, 2, 6–9, 11, 127, 128, 702/137; 250/253–256, 261; 73/152.01, 73/152.02, 152.03, 152.05, 152.07, 73/152.11
See application file for complete search history.

(56) References Cited

U.S. PATENT DOCUMENTS

| | | | |
|---|---|---|---|
| 8,170,799 B2 | 5/2012 | Dvorkin | |
| 9,142,045 B1 | 9/2015 | Cavanaugh | |
| 9,412,023 B1 | 8/2016 | Hurley | |
| 9,507,047 B1 | 11/2016 | Dvorkin | |
| 9,652,684 B2 | 5/2017 | Keskes | |
| 10,927,671 B1 | 2/2021 | Tonner | |
| 10,991,078 B2 * | 4/2021 | Hakimuddin | G06V 10/764 |
| 11,188,794 B2 | 11/2021 | Yao | |
| 11,649,723 B2 * | 5/2023 | Allo | G06V 10/82 382/109 |
| 2005/0276513 A1 | 12/2005 | Ojanen | |
| 2010/0128932 A1 | 5/2010 | Dvorkin | |
| 2012/0123756 A1 | 5/2012 | Wang | |
| 2013/0073207 A1 | 3/2013 | Ganz | |
| 2013/0120763 A1 | 5/2013 | Grenet | |
| 2013/0259190 A1 | 10/2013 | Walls | |
| 2013/0308831 A1 | 11/2013 | Dvorkin | |
| 2014/0046628 A1 | 2/2014 | Ligneul | |
| 2015/0043787 A1 | 2/2015 | Fredrich | |
| 2016/0370274 A1 | 12/2016 | Rowe | |
| 2017/0085860 A1 | 3/2017 | Zhang | |
| 2018/0101962 A1 | 4/2018 | Takizawa | |
| 2018/0180524 A1 | 6/2018 | François et al. | |
| 2019/0212272 A1 | 7/2019 | Scoullar | |
| 2019/0338637 A1 | 11/2019 | Francois | |
| 2019/0368336 A1 | 12/2019 | Hammond | |
| 2020/0025667 A1 | 1/2020 | Allo | |
| 2020/0143205 A1 | 5/2020 | Yao | |
| 2020/0150307 A1 | 5/2020 | Myers | |
| 2020/0157929 A1 | 5/2020 | Torrione | |
| 2021/0041588 A1 | 2/2021 | Chen | |
| 2021/0254457 A1 | 8/2021 | Anifowose et al. | |
| 2021/0312674 A1 | 10/2021 | Abrol | |
| 2021/0319257 A1 | 10/2021 | François et al. | |
| 2023/0184992 A1 | 6/2023 | AlBahrani | |
| 2023/0220761 A1 | 7/2023 | Yamada | |
| 2023/0220770 A1 | 7/2023 | Yamada | |
| 2023/0351580 A1 | 11/2023 | Di Santo | |
| 2024/0054766 A1 | 2/2024 | Yu | |

FOREIGN PATENT DOCUMENTS

| | | |
|---|---|---|
| WO | 2019167030 A1 | 9/2019 |
| WO | 2022032057 A1 | 2/2022 |

OTHER PUBLICATIONS

Ameen et al., The function of fractures and in-situ stresses in the Khuff reservoir performance, onshore fields, Saudi Arabia, American Association of Petroleum Geologists Bulletin, vol. 94, No. 1, Jan. 2010, pp. 27-60.

Barrett, P. J. "The shape of rock particles, a critical review", Sedimentology, 1980, 27, pp. 291-303.

Beard et al., Influence of texture on porosity and permeability of unconsolidated sand. American Association of Petroleum Geologists Bulletin, vol. 27, No. 2, Feb. 1973, p. 349-369.

Becerra, D. et al., "Generating a labeled data set to train machine learinig algorithms for lithologic classification of drill cuttings", Special section: Machine learning for image-based geologic interpretation, SEG, 2022, pp. SE85-SE100.

Blaschke et al., Object-Based Image Analysis. Springer. p. 37. ISBN: 978-3-540-77057-2, 2008, 30 pages.

Caicedo, J. C. et al., "Nucleus segmentation across imaging experiments: the 2018 Data Science Bowl", Nature Methods, 2019, 16, pp. 1247-1253.

Dunlop, H. et al., "Multi-scale Features for Detection and Segmentation of Rocks in Mars Images", 2007, 10.1109/CVPR.2007.383257, 7 pages.

Feng, L. et al., "Robust Nucleus Detection with Partially Labeled Exemplars", IEEE Access (7), 2019, pp. 162169-162178.

Gaetano, R. et al., "Hierarchical Texture-Based Segmentation of Multiresolution Remote-Sensing Images", IEEE Transactions on Geoscience and Remote Sensing, 2009, 47(7), pp. 2129-2141.

He, K. et al., " Mask R-CNN", Computer Vision (ICCV), IEEE International Conference on Computer Vision, 2017, pp. 2980-2988.

He, K. et al., "Deep Residual Learning for Image Recognition", 2016 IEEE International Conference on Computer Vision, 2016, pp. 770-778.

Huo, F. et al., "Novel lithology identification method for drilling cuttings under PDC bit condition", Journal of Petroleum Science and Engineering, 2021, 205, 15 pages.

Jung, H. et al., "An automatic nuclei segmentation method based on deep convolutional neural networks for histopathology images", BMC Biomedical Engineering, 2019, 1:24, 12 pages.

Liang, Z. et al., "A particle shape extraction and evaluation method using a deep convolutional neural network and digital image processing", Powder Technology, 2019, 353, pp. 156-170.

(56) References Cited

OTHER PUBLICATIONS

Lin, T. Y., et al., "Microsoft COCO: Common Objects in Context", ECCV 2014: Computer Vision—ECCV 2014, pp. 740-755.

Lin, T.-Y., et al., "Feature Pyramid Networks for Object Detection", Computer Vision and Pattern Recognition (CVPR), IEEE International Conference on Computer Vision 2017, pp. 936-944.

Rahmani, H. et al., "Automated segmentation of gravel particles from depth images of gravel-soil mixtures", Compute and Geosciences, 2019, 128, pp. 1-10.

Ravali, K. et al., "Graph—Based High Resolution Satellite Image Segmentation for Object Recognition", The International Archives of the Photogrammetry, Remote Sensing and Spatial Information Sciences, 2014, vol. XL-8, pp. 913-917.

Sanxo—Scope HD U4 Express: Industrial Microscope downloaded from the internt at [https://sanxo.eu/sanxo-scope-hd-u4-express-industrial-microscope/] on Apr. 21, 2022, 8 pages.

Sharpness: What is it and how it is measured. Imatest, Retrieved Mar. 4, 2022, from https://www.imatest.com/docs/sharpness/, 17 pages.

Shi, J. et al., "Normalized Cuts and Image Segmentation", IEEE Transactions on Pattern Analysis and Machine Intelligence, 2000, 22(8), pp. 888-905.

Thurley, M. J., "Automated Image Segmentation and Analysis of Rock Piles in an Open-Pit Mine", International Conference on Digital Image Computing: Techniques and Applications (DICTA), 2013, 10.1109/DICTA.2013.6691484, 8 Pages.

Ting, G. et al., "Rock Particle Image Segmentation Based on Improved Normalized Cut", International Journal of Control and Automation, 2017, 10(4), pp. 271-286.

Wang, W., "Rock Particle Image Segmentation and Systems", in Pattern Recognition Techniques, Technology and Applications, Book edited by: Peng-Yeng Yin, Nov. 2008, I-Tech, Vienna, Austria, 10.5772/6242, 30 pages.

"Mongoose Pro Dynamic dual-motion shaker", retrieved from the internet: [https://www.slb.com/drilling/drilling-fluids-and-well-cementing/solids-control/shale-shakers/mongoose-pro-shale-shaker] Apr. 19, 2022, 9 pages.

"pytorch/vision" downloaded from the internet at [https://github.com/pytorch/vision] retrieved on Apr. 21, 2022, 6 pages.

Using colorcheck. Imatest, Retrieved Mar. 4, 2022, from https://www.imatest.com/docs/colorcheck/, 26 pages.

Wikipedia "Run-length encoding", downloaded from the internet at [https://en.wikipedia.org/wiki/Run-length_encoding] retrieved on Apr. 21, 2022, 3 pages.

Wikipedia "Semi Supervised Learning" downloaded from the internet at [https://en.wikipedia.org/wiki/Semi-supervised_learning] retrieved on Apr. 21, 2022, 7 pages.

Wikipedia "Transfer Learning" downloaded from the internet at [https://en.wikipedia.org/wiki/Transfer_learning] retrieved on Apr. 21, 2022, 5 pages.

Search Report and Written Opinion of International Patent Application No. PCT/US2023/070658 dated on Nov. 8, 2023, 12 pages.

* cited by examiner

FORMATION POROSITY ESTIMATION FROM DIGITAL IMAGES

CROSS REFERENCE TO RELATED APPLICATIONS

This application is the National Stage Entry of International Application No. PCT/US2023/070658, filed on Jul. 21, 2023, which claims priority to U.S. Provisional Patent Application No. 63/369,028, filed on Jul. 21, 2022, and U.S. Provisional Patent Application No. 63/379,941, filed on Oct. 18, 2022. Each of the above applications is incorporated herein by reference in its entirety.

BACKGROUND

Formation porosity and permeability are among the most important physical properties of a reservoir and are often used to provide an estimate of the volume of recoverable fluids in the reservoir. Porosity is commonly understood to be a measure of the ratio of pore volume to the total volume of the formation rock while permeability is commonly understood to be a measure of the connectivity of individual pores to one another.

Formation porosity may be measured a number of ways. For example, porosity is commonly inferred from neutron porosity logs acquired during logging while drilling (LWD) and/or wireline logging operations. While neutron porosity measurements are commercially utilized, a number of assumptions may be made to arrive at an estimated formation porosity value. Moreover, neutron porosity logs generally require extensive calibration to achieve reliable porosity estimates.

Formation porosity measurements are also commonly made on sidewall core plug samples or whole core plug samples of the formation rock (e.g., obtained during a coring operation while constructing the wellbore). For example, the porosity of the obtained core samples may be measured using a porosimeter. While such porosimeter measurements are generally believed to provide accurate porosity values, they can be time consuming and labor intensive. There is a need in the industry for improved methods for making formation porosity measurements, particularly methods that automate or partially automate the measurement process.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Embodiments of this disclosure include systems and methods for estimating formation porosity. One example method includes acquiring a calibrated digital image of cuttings particles separated from drilling fluid circulating in a wellbore. Color features and/or texture features are extracted from the cuttings particles in the digital image and evaluated with a model to estimate the porosity. In example embodiments, a plurality of individual cuttings particles is evaluated to estimate a corresponding plurality of porosity values. The estimated porosity values may be further processed to compute an average porosity, for example, including a mean porosity, a median porosity, or a porosity distribution. The disclosed embodiments may advantageously enable accurate porosity estimates to be made in near real time in substantially any drilling operation (including those in which logging measurements are not possible). Moreover, the disclosed embodiments may enable formation porosity measurements to be made in operations in which conventional logging measurements are not possible, for example, coiled tubing or dry drilling operations.

Figures 1, 6:
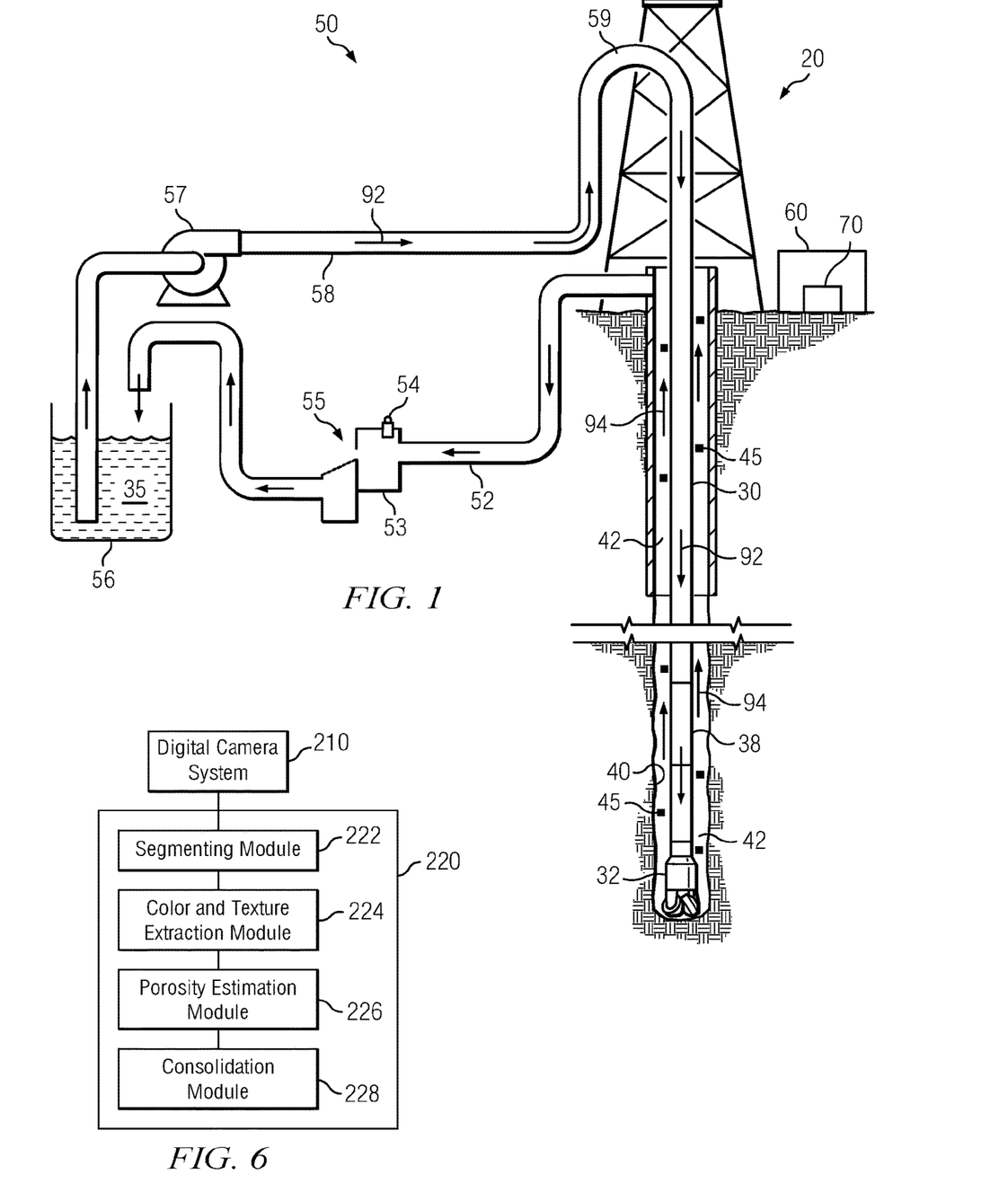
FIG. 1 depicts an example drilling rig including an example system for estimating formation porosity.
FIG. 6 depicts a block diagram of an example system for estimating rock porosity.

FIG. 1 depicts an example drilling rig 20 including a system 70 for automatically estimating formation porosity from drill cuttings extracted from circulating drilling fluid. The drilling rig 20 may be positioned over a subterranean formation (not shown). The rig 20 may include, for example, a derrick and a hoisting apparatus (also not shown) for raising and lowering a drill string 30, which, as shown, extends into wellbore 40 and includes, for example, a drill bit 32 and one or more downhole measurement tools 38 (e.g., a logging while drilling tool or a measurement while drilling tool) in a bottom hole assembly (BHA) above the bit 32. Suitable drilling systems, for example, including drilling, steering, logging, and other downhole tools are well known in the art.

Drilling rig 20 further includes a surface system 50 for controlling the flow of drilling fluid used on the rig (e.g., used in drilling the wellbore 40). In the example rig depicted, drilling fluid 35 is pumped downhole (as depicted at 92), for example, via a conventional mud pump 57. The drilling fluid 35 may be pumped, for example, through a standpipe 58 and mud hose 59 in route to the drill string 30. The drilling fluid 35 typically emerges from the drill string 30 at or near the drill bit 32 and creates an upward flow 94 of mud through the wellbore annulus 42 (the annular space between the drill string and the wellbore wall). The drilling fluid 35 then flows through a return conduit 52 to a mud pit system 56 where may be recirculated. It will be appreciated that the terms drilling fluid and mud are used synonymously herein.

The circulating drilling fluid 35 is intended to perform many functions during a drilling operation, one of which is to carrying drill cuttings 45 to the surface (in upward flow 94). The drill cuttings 45 are commonly removed from the returning mud via a shale shaker 55 (or other similar solids control equipment) in the return conduit (e.g., immediately upstream of the mud pits 56). Formation gases that are released during drilling may also be carried to the surface in the circulating drilling fluid. These gasses are commonly removed from the fluid, for example, via a degasser or gas trap 54 located in or near a header tank 53 that is immediately upstream of the shale shaker 55 in the example depiction. The drill cuttings 45 may be evaluated to estimate the porosity of the subterranean formation layers though which the wellbore is drilled as described in more detail below.

The rig 20 may include a system 70 configured to take and automatically evaluate digital images of the drill cuttings and estimate formation porosity as described in greater detail herein. The system 70 may be deployed at the rig site (e.g., in an onsite laboratory 60) or offsite. The disclosed embodiments are not limited in this regard. The system 70 may include computer hardware and software configured to automatically or semi-automatically evaluate the cuttings images. To perform these functions, the hardware may include one or more processors (e.g., microprocessors) which may be connected to one or more data storage devices (e.g., hard drives or solid state memory). As is known to those of ordinary skill, the processors may be further connected to a network, e.g., to receive the images from a networked camera system (not shown) or another computer system. It will, of course, be understood that the disclosed embodiments are not limited the use of or the configuration of any particular computer hardware and/or software.

While FIG. 1 depicts a land rig 20, it will be appreciated that the disclosed embodiments are equally well suited for land rigs or offshore rigs. As is known to those of ordinary skill, offshore rigs commonly include a platform deployed atop a riser that extends from the sea floor to the surface. The drill string extends downward from the platform, through the riser, and into the wellbore through a blowout preventer (BOP) located on the sea floor. The disclosed embodiments are not limited in these regards.

Figure 2A:
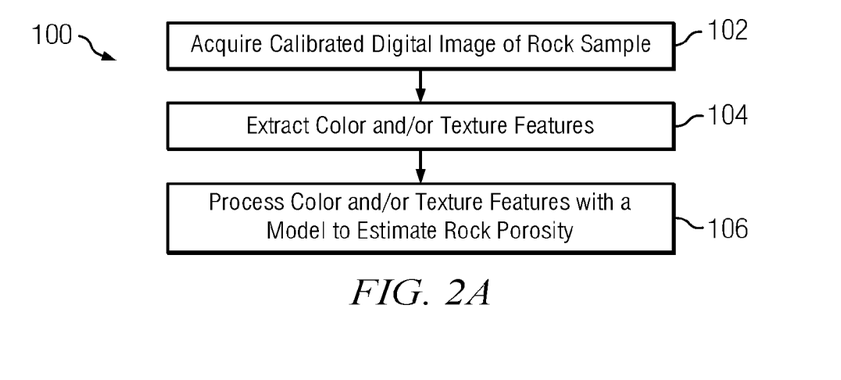
FIGS. 2A and 2B (collectively FIG. 2) depict flow charts of an example methods for estimating formation porosity.
Figure 2B:
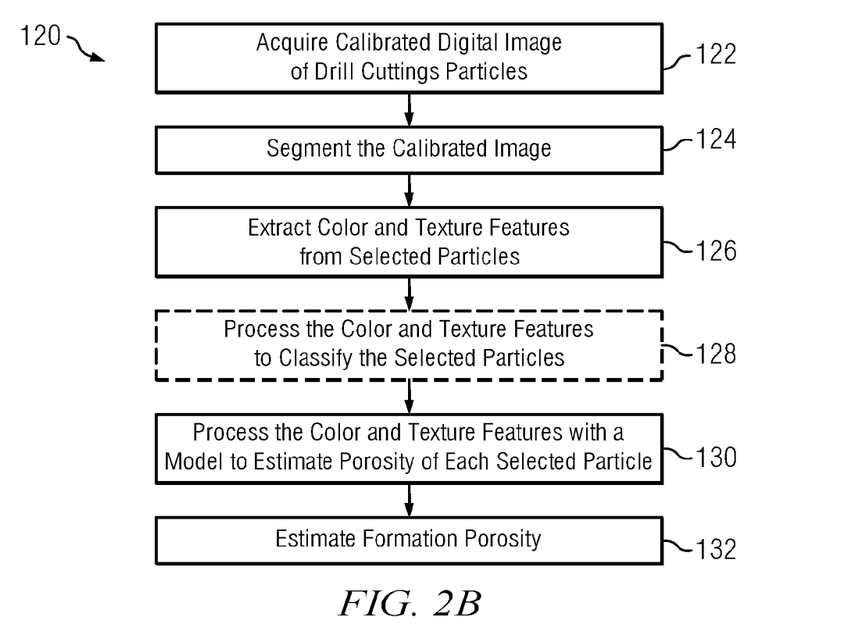

FIGS. 2A and 2B (collectively FIG. 2) depict flow charts of example methods 100 and 120 for estimating formation porosity. In FIG. 2A, method 100 includes acquiring at least one calibrated digital image of a rock sample, such as a sidewall or whole core sample or one or more drill cuttings particles. The calibrated digital image(s) may be processed to extract color features and/or texture features from the rock sample at 104. The extracted color features and texture features may then be evaluated (processed) with a model at 106 to estimate the porosity (e.g., the previously unknown porosity) of the rock sample. In example embodiments, the model may be an empirical model that correlates digital image color features and digital image texture features with porosity. Example model embodiments are described in more detail below.

In FIG. 2B, method 120 includes acquiring at least one calibrated digital image of cuttings particles separated from drilling fluid at 122. The cuttings particles may be generated, for example, while drilling a wellbore and may be transported to the surface in circulating drilling fluid as described above with respect to FIG. 1. The calibrated digital image may be processed with a segmenting algorithm to obtain segmented images at 124. The segmenting algorithm may be configured, for example, to identify a plurality of individual cuttings particles in the calibrated image(s). The segmented image may be processed at 126 to extract color and texture features from each of a plurality of selected cuttings particles in the image. For example, the color and/or texture features may be extracted from each of the segmented particles or a subset of the segmented particles (e.g., only those having a size greater than a threshold). The selected particles may be evaluated particle by particle, for example, to extract the color and texture features.

In example embodiments, the color and texture features may be processed at 128 to classify each of the selected cuttings particles with a corresponding lithology type (such as sandstone, limestone, shale, etc.). The extracted color and/or texture features may then be further processed with a model (a porosity model) at 130 to estimate the porosity (e.g., the previously unknown porosity) of each selected particle. As described in more detail below, the model may be selected, for example, based on the lithology classification at 128. For example, a first porosity model may be used for sandstone, a second porosity model for limestone, a third porosity model for shale, and so on. It will be appreciated that the processing in 130 may generate a plurality of porosity values (e.g., one for each of the selected cuttings particles). These porosity values estimated at 130 may be further processed to estimate a formation porosity at 132, for example, via computing a mean or median value of the estimated porosity values of each of the selected particles.

With continued reference to FIG. 2, it will be appreciated that methods 100 and 120 may advantageously enable automated (or semi-automated) estimation of formation porosity without (or with limited) human intervention. For example, in method 100, processing the calibrated image to extract color and texture features at 104 and evaluating the extracted features with a model to estimate the porosity at 106 may be performed automatically. In method 120, segmenting the image at 124, classifying the lithology of selected particles at 126, extracting color and texture features at 128, and estimating cuttings and formation porosity at 130 and 132 may be performed automatically without human intervention.

Figure 3:
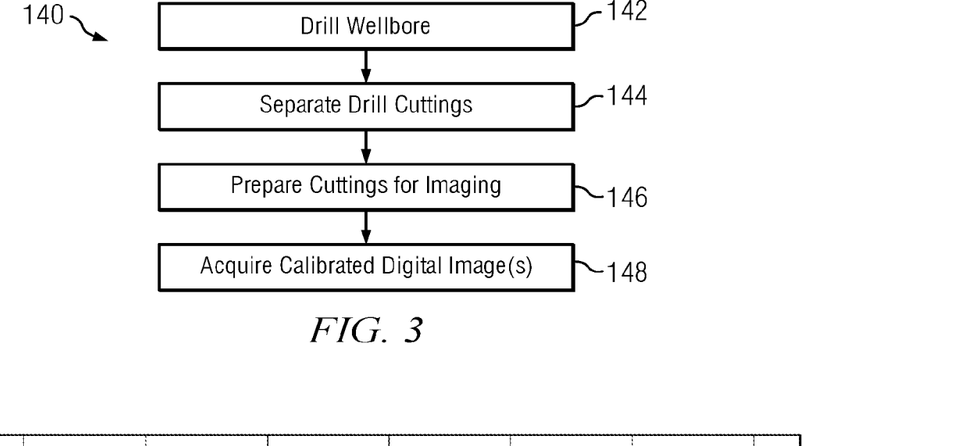
FIG. 3 depicts an example method for acquiring calibrated digital images of drill cuttings particles.

Turning now to FIG. 3, one example method 140 for separating the rock cuttings from the drilling fluid and acquiring a calibrated digital image at 102 and 122 of FIG. 2 is depicted. A borehole is drilled through a subterranean formation of interest at 142, for example, using the example rig 20 described above with respect to FIG. 1. The rock cuttings generated while drilling are transported to the surface in the upwardly flowing drilling fluid (e.g., as depicted in FIG. 1). The cuttings may be collected at 144, for example, using a shale shaker or other solids separation/control equipment. In example embodiments, the cuttings obtained from the shale shaker may be prepared for image analysis at 146, for example, by washing and then drying in an oven and/or sieving or meshing the cuttings to remove large and/or small particles (e.g., to remove a portion of the cuttings particles). One intent of the preparation procedure is to reveal the color and texture of the rock by removing fluid and other residue from the surfaces thereof that may interfere with color and texture extraction.

The prepared cuttings may further be placed in a tray having a high contrast (vivid) background color to enhance subsequent particle identification and segmentation in the acquired images, for example, pure magenta (e.g., with RGB values of 255, 0, 255), pure blue (e.g., with RGB values of 0, 0, 255), pure green (e.g., with RGB values of 0, 255, 0), and so forth. In general, such colors do not exist in nature and, accordingly, help instance segmentation models avoid detecting the background of the tray as part of the particle. The tray may be placed in front of a digital camera and at least one digital image may be taken at 148. For example, a white light image (in which the cuttings are illuminated with white light) may be taken at 148. In other example embodiments, multiple digital images may be taken at 148, for example, a first white light image and a second infrared or ultraviolet image (in which the cuttings are illuminated with infrared or ultraviolet light) or even a first white light image, a second infrared image, and a third ultraviolet image. The disclosed embodiments are not limited in these regards; however, it will be appreciated that the acquisition of multiple images may be advantageous in that certain texture and/or color features may be more readily discerned in infrared or ultraviolet light than in white light (particularly in ultraviolet light).

It will be understood that acquiring a calibrated digital image may advantageously make use of standardized and/or calibrated lighting, color enhancement, magnification, and/or focus/resolution settings. For example, in certain embodiments, color/illumination calibration is obtained by using colorimetry algorithms against previously analyzed photos and a current photo of interest, while resolution calibration may be based on lens focal length, focal distance, and sensor size/resolution for the current photo of interest as compared to that of previously analyzed photos. Images may be taken when the cuttings are wet or dry, with the humidity generally being controlled for dry cuttings images.

With reference again to FIG. 2B, in example embodiments, the segmenting algorithm may employ a Mask Region-Based Convolutional Neural Network (Mask R-CNN) such as disclosed in U.S. patent application Ser. No. 17/647,407, which is incorporated by reference herein in its entirety. The Mask R-CNN may be configured to identify the individual cuttings particles in the digital images and thereby generate the segmented image at 124. For example, the Mask R-CNN may produce, for example, bounding boxes and mask images. The bounding boxes may be defined as a set of x-y coordinates in an image that indicates an image region that contains an object of interest. The bounding box may include a confidence score that ranges from 0 to 1 (e.g., with greater values indicating higher confidence regarding) for each object of interest. The mask image may indicate (e.g., highlight or otherwise bound) regions of interest that have a confidence score that exceeds a threshold.

It will be appreciated that Mask R-CNN is a model architecture that falls in the supervised learning category, meaning that it commonly requires a training dataset that includes images and corresponding labels. For example, the model may be trained using images including cuttings particles of various sizes, shapes, colors, and lithology types. It will be further appreciated that the R-CNN model may be continuously retrained during a drilling operation or between drilling operations in a field. For example, segmentation errors may be identified and corrected and then used to generate labeled training images that may be used to retrain (or further train) the R-CNN.

In example embodiments, a segmented image may depict a plurality of cuttings particles on a high contrast tray. The individual particles may be identified, for example, via a particle outline or other demarcation. Moreover, each identified particle may be identified by a corresponding set of pixels in the image. Stated another way the segmented image may include a pixel by pixel segmentation in which each pixel in the image is assigned to the background or to a single individual particle.

With further reference to FIGS. 2A and 2B, methods 100 and 120 include extracting color and texture features at 104 and 126 from a calibrated digital image or a segmented digital image. The extracted color and texture features may include color related features, texture related features, grain size related features, and shape and size related features of each of a plurality of individual cuttings particles. The color related features may include, for example, average (such as mean, median, or mode) red, green, and blue intensities or distributions of or standard deviations of red, green, and blue intensities and/or an average luminance of each particle. The color related features may further include a histogram, a variance, a skewness, and/or a kurtosis of the red, green, and blue intensities. Moreover, for infrared and/or ultraviolet images, the color related features may include average (such as mean, median, or mode) infrared or ultraviolet intensities or distributions of or standard deviations of infrared or ultraviolet intensities and/or an average infrared or ultraviolet luminance of each particle. The color related features may further include a histogram, a variance, a skewness, and/or a kurtosis of the infrared or ultraviolet intensities.

The texture related features may quantify various spatial relationships and/or directional changes in pixel color and/or brightness in each particle. Extracted texture related features may include, for example, edge detection, pixel to pixel contrast, correlation, and/or entropy. In addition, in certain embodiments, texture related features may be extracted with techniques such as image texture filters (e.g., Gabor filters, and so forth), an autoencoder, or other deep learning based techniques. Moreover, directional changes may be evaluated, for example, for symmetry and used to generate spectra that may be further compared with reference spectra to assign a texture classification to each particle, such as homogeneous, heterogeneous, grainy, laminate, etc. The texture features may be further evaluated, for example, to characterize the grain size or grain size distribution of grains in the formation or cuttings particles. For example, the grain size may be identified as fine, medium, coarse or as having an average size and size distribution.

In example embodiments of method 120, segmented images may be further processed to extract geometry features of the cuttings particles, such as size and shape features. Size and shape related features may include, for example, a particle diameter, an area, a perimeter, a maximum axis, a minimum axis, a particle aspect ratio, and internal angle measurements. Moreover, the geometry related features may further include spatial relationships of the pixels grouped in each particle to extract particle circularity, solidity, elongation, roundness, and/or convex hull area. Individual particles may further be classified, for example, as being a plate, a fiber, circular or oval particulate, sharp angled particulate, etc. as well as being classified in one of various size bins (e.g., based on the diameter, cross sectional area, and/or perimeter of the particle).

It will be appreciated that the color, texture, and geometry feature extraction may make use of a trained machine learning algorithm or any other deep learning algorithm. Such an algorithm may be trained, for example, using extracted color and texture features of different cuttings particle types (e.g., lithology types), sizes, shapes, colors, etc. and may make use of an image database including visible, infrared, and/or ultraviolet images of cuttings particles. Such a database may be maintained on-site (e.g., at the rig location) or off-site (e.g., at an off-site processing center or other location).

With still further reference to FIG. 2B, the extracted color and/or texture features may be optionally processed at 128 to classify at least one of the identified cuttings particles with a corresponding lithology type, for example, as described in U.S. patent application Ser. No. 17/647,412, which is incorporated by reference herein in its entirety. In general, the lithology of a rock or cuttings particle is a description of its physical characteristics visible at an outcropping, in hand or core samples, or with low magnification microscopy. Lithology may refer to either a detailed description of these physical characteristics, or a summary of the gross physical character of a rock. In a second sense, the lithology of a rock (or cuttings particle) refers to a type of rock or a gross (or macro) identification or classification of the rock. Example lithologies or lithology types in this second sense include sandstone, limestone, slate, shale, basalt, coal, anhydrite, dolomite, gypsum, clay, chert, granite, and the like. As such, color and/or texture features represent physical characteristics of a lithology that may be measured and quantified from a digital image and evaluated to determine the lithology of a formation (in the second sense). For example, the color and/or texture features extracted from selected particles in the segmented image may be evaluated using a trained model to classify the lithology type(s) of those selected particles.

The formation porosity may be estimated (or identified) by the model at 106 and 130, 132 of methods 100 and 120, for example, according to a "location" of the particle in a multi-dimensional space of extracted color and texture features. For example, as described above, a set of color and texture features may be computed (e.g., for each of the selected cuttings particles). The set of computed color and texture features may include a large number of features, for example, including at least 16 features (e.g., at least 32, 48, 64, 80, 96, 112, or 128 features). The model may be configured to correlate the color and texture features with formation porosity such that in practice the model assigns a porosity value to a rock (or a cuttings particle) based on the set of values of those features (or stated another way based on the location of the rock in the aforementioned multi-dimensional color/texture feature space). As described in more detail below, the model may include multiple models, each of which may be built or trained for a particular lithology type. For example, in method 120, an appropriate model may be selected at 128 for the particular lithology type identified at 126.

Figure 4:
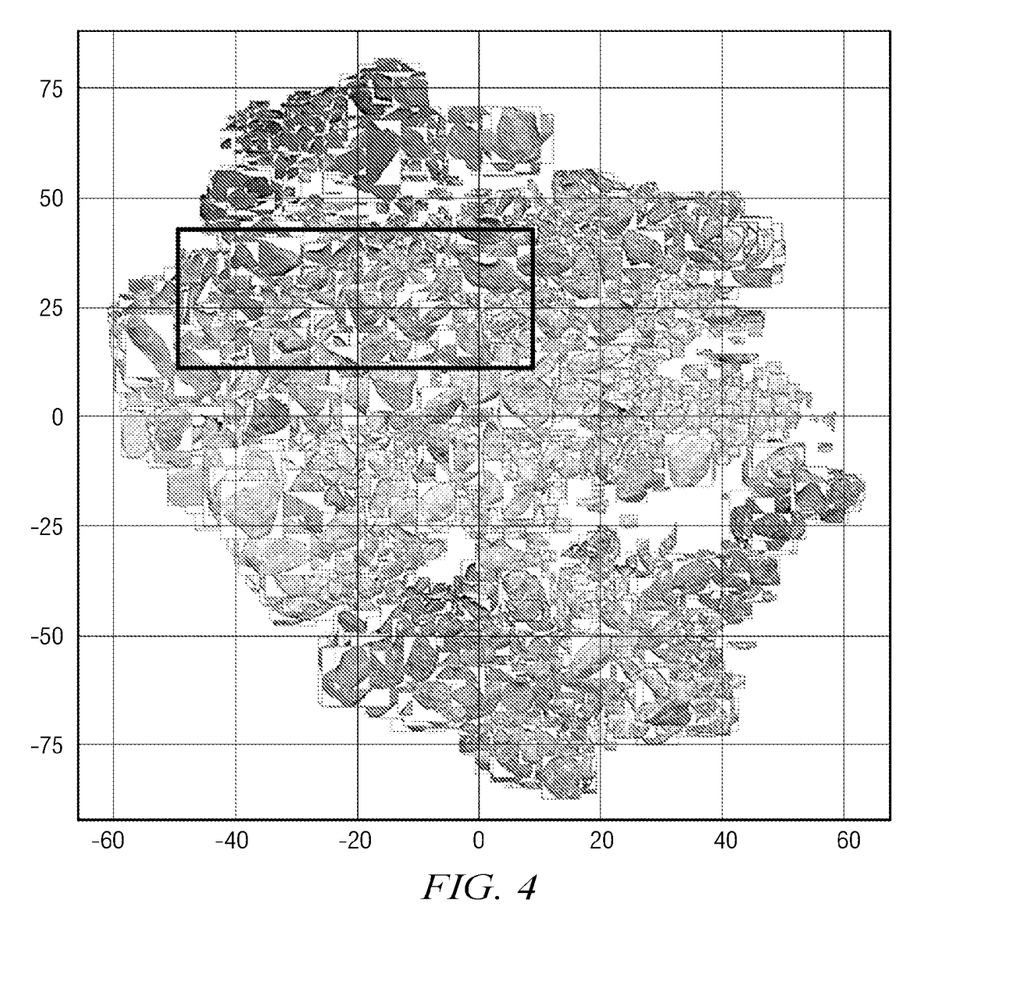
FIG. 4 depicts an example clustering of cuttings particles in a synthetic two-dimensional representation of a multidimensional hyperspace of extracted color and texture features.

FIG. 4 depicts an example clustering of cuttings particles in a synthetic two-dimensional representation of a multidimensional hyperspace of extracted color and texture features that would otherwise be difficult (or impossible) to represent. In example embodiments the porosity of each of the particles may be assigned based on the clustering. In such an embodiment, groups of particles located in the same cluster (or local region of the hyperspace) may be assigned the same porosity value.

One aspect of the disclosed embodiments was the realization that some of the same rock properties that control or influence porosity also influence the macroscopic visual appearance of the rock. For example, it was realized that the fabric (how the individual particles or grains of the rock are organized), minerology (the relative amounts and kinds of mineral constituents), diagenesis (changes of sediments or sedimentary rock into different rock), and grain size (the size of individual grains of sediment in the rock) of the rock influence both the porosity of the rock and the macroscopic visual appearance of the rock. It was further realized that the macroscopic visual appearance of the rock may be quantified with a suite (or set) of color and texture properties from calibrated digital images of the rock and that these color and texture properties may then be correlated with rock porosity using a trained model.

Figure 5:
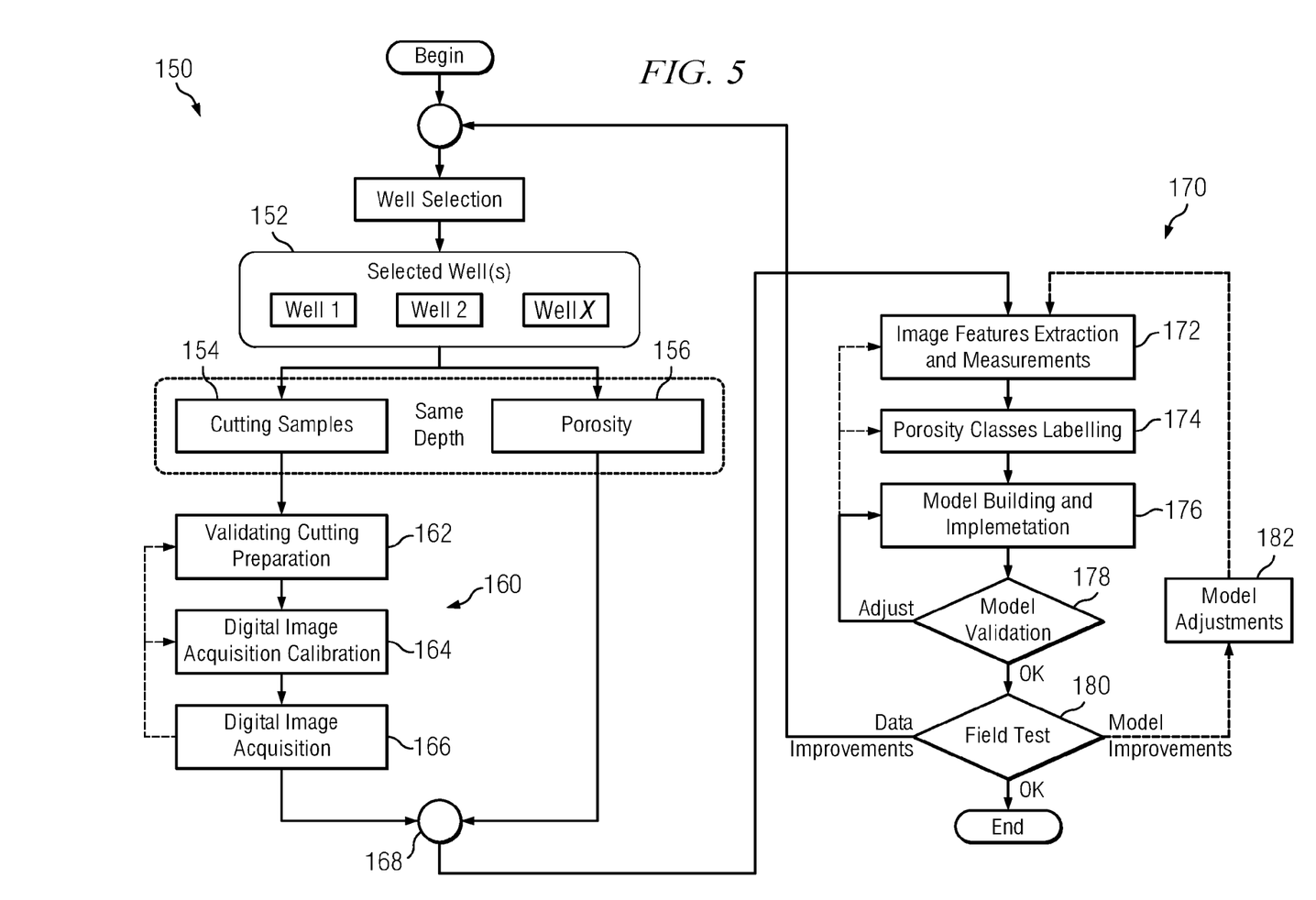
FIG. 5 depicts a flow chart of an example method for building a porosity model that correlates color and texture features with rock porosity.

Turning now to FIG. 5, a flow chart of one example method 150 for generating (or training in example embodiments) a porosity model that correlates digital image features (such as color and texture features) with rock porosity is depicted. For example, method 150 may be configured to generate the porosity model used at 106 and 130 of FIGS. 2A and 2B. The model may be generated, for example, using drill cuttings samples obtained at 154 from a set of one or more selected wells (e.g., Well 1, Well 2, . . . . Well X shown at 152). These wells may be drilled in the same local region (e.g., within the same field or reservoir) and through the same or similar strata and formation lithologies.

Porosity measurements are made at 156 on the formation rock (e.g., the strata and various lithologies) thorough which the wells penetrate. These porosity measurements may be made using substantially any suitable porosity measurement techniques, for example, including while drilling and wireline logging measurements as well as porosimeter measurements made on core samples obtained during or after the drilling operation. In example embodiments, the porosity measurements may enable a porosity log to be developed that quantifies formation porosity as a function of wellbore depth and/or formation strata. Such porosity measurement and logging techniques are well known in the industry.

With continued reference to FIG. 5, calibrated digital images of the acquired cuttings are taken at 160, for example, as described above with respect to FIG. 3. The process 160 may include establishing and validating a cuttings preparation procedure at 162, calibrating the digital photographic acquisition procedure at 164, and acquiring (or taking) the calibrated digital images at 166. The procedure may be validated and fine-tuned as indicated to ensure adequate image to image consistency. The cuttings depicted in the calibrated digital images may be assigned corresponding measured porosity values at 168 from the porosity measurements and/or porosity log made at 156.

The digital images of the cuttings having known porosity values (e.g., measured as described above) are then processed at 170 to develop a correlation between color and texture features and the known porosity and thereby generate and/or train the model. As depicted, the model building and/or training at 170 may include processing the images to extract the color and texture features at 172. These color and texture features may include the multiple features described above with respect methods 100 and 120 depicted in FIG. 2. The model building may further include labelling porosity classes and/or relationships between the extracted features and the known porosity at 174. In example embodiments, the color and texture features that best correlate with formation porosity may be manually and/or automatically selected, for example, via regression analysis or using a machine learning algorithm. The model may be iteratively built and validated at 176 and 178 as indicated. The model may be further verified, updated, and/or retrained, for example, via field testing at 180 and 182. The field testing may include, for example, comparing porosity values obtained with the model and porosity values obtained via conventional measurements.

With continued reference to FIG. 5, the processing at 170 may include, for example, a nearest neighbor regression based on the distance (e.g., the Euclidean distance) between cuttings in a multi-dimensional color and texture space of the particles having known porosity to develop the multi-dimensional correlation and build the model. It will be appreciated that there is no training step when using a nearest neighbor regression method. In such embodiments, a local region may be defined by the number K-nearest neighbor reference cuttings, where K may be substantially any number of nearest neighbors (such as 5, 10, 20, or 50). In other embodiments, the processing at 170 may include (or further include) the use of a machine learning algorithm at 170 to build and train the model.

It will be understood that even after successfully field testing the porosity model, it may from time to time fail to accurately estimate a formation porosity. In such instances, the formation porosity may be measured or verified using conventional measurement techniques and the evaluated particle(s) may be relabeled with the measured porosity. These re-labeled image(s) (including the labeled particles) may then be used to further update and/or train the porosity model in a manner similar to that indicated at 180 and 182.

With continued reference to FIG. 5, it will be appreciated that it may be advantageous to develop multiple distinct porosity models and/or reference datasets for a field or a local region. For example, a distinct porosity model may be developed for each formation lithology (or lithology type) within a field (e.g., a first model for sandstone, a second model for limestone, a third model for shale, and so on). In such embodiments, the distinct models may make use of the same set or different sets of color and/or texture features. For example, in one embodiment, first and second models developed for corresponding first and second lithologies may make use of the same set of color and texture features. In this embodiment, a particular location in the multi-dimensional feature space may map to a first porosity value in the first model and a second different porosity value in the second model. Stated another way, the first model may include a first correlation between the multi-dimensional feature space and porosity and the second model may include a second different correlation between the multi-dimensional feature space and porosity. In a second example embodiment, first and second models corresponding to first and second lithologies may make use of first and second different sets of color and/or texture features such that the porosity correlation is based on different multi-dimensional feature spaces. The disclosed embodiments are not limited in these regards.

With reference again to FIG. 2, it will be appreciated that the generated model may be used to estimate the unknown porosity values of rock samples and/or cuttings particles. In example embodiments, the model (or models) may be generated using cuttings particles obtained from a first well. The generated model(s) may then be used to estimate the unknown porosity of cuttings acquired while drilling a second, different well. It will therefore be understood that the model(s) generated in method 150 (FIG. 5) may be implemented in methods 100 and 120 (FIG. 2).

FIG. 6 depicts a block diagram of an example system 200 for estimating a porosity of a rock sample or a cuttings particle sample (or samples). The system 200 includes a digital camera system 210 configured to take one or more calibrated digital images of a rock sample of cuttings particles separated from drilling fluid. The digital camera system may include substantially any suitable digital camera (or cameras) sensitive to infrared, visible, and/or ultraviolet light. The system further includes a digital image processing system 220, for example, including one or more processors or computing systems. The digital image processing system 220 may include a segmenting module 222 configured to process a calibrated digital image to identify individual ones of the cuttings particles depicted in the calibrated image. The digital image processing system 220 further includes a color and texture feature extraction module 224 configured to extract color and/or texture features (as described above) from the calibrated digital image or from selected ones of the identified solid particles in the segmented image. The digital image processing system 220 further includes a porosity estimation module 226 that includes a model or dataset that correlates the extracted color and/or texture features with an estimated porosity value of the rock or cuttings particle. The digital image processing system 220 may further include a consolidation module 228 configured to compute an average (e.g., mean or median) porosity value of selected particles in a digital image and to report the average value as a formation porosity value.

Figure 7A:
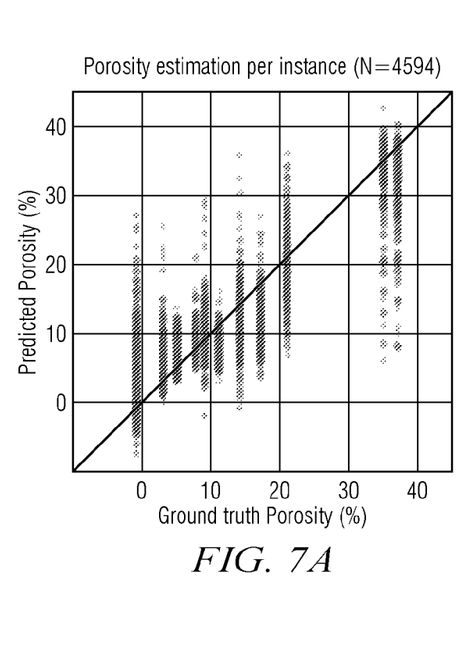
FIGS. 7A, 7B, and 7C (collectively FIG. 7) depict plots of predicted porosity versus ground truth porosity generated in a first porosity model validation test using limestone cuttings particles.
Figure 7B:
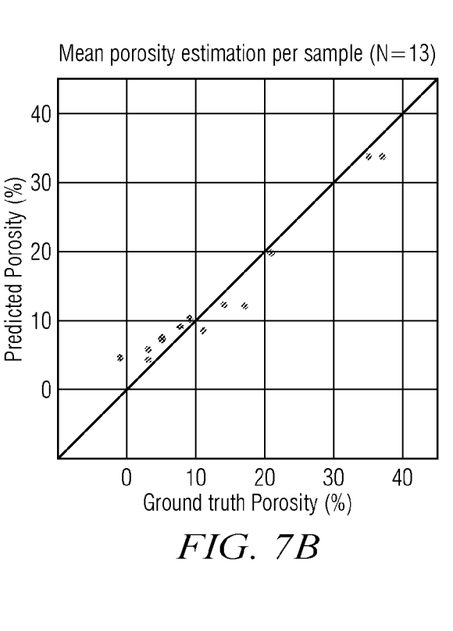
Figure 7C:
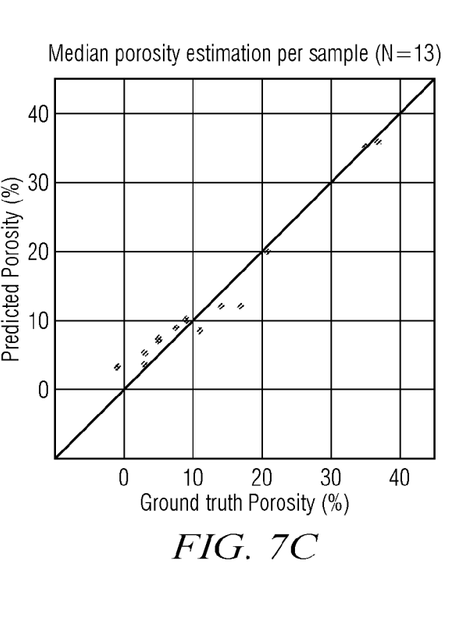

Turning now to FIGS. 7A, 7B, and 7C (collectively FIG. 7) and FIGS. 8A, 8B, and 8C (collectively FIG. 8), summarized results of first and second validation tests are depicted. In FIG. 7, limestone cuttings particles having known porosity values were tested. In FIG. 8, sandstone cuttings particles having known porosity values were tested. In each case the cuttings particles having known porosity values were obtained by measuring the porosity of multiple rock cores and then crushing each of the rock cores to obtain simulated cuttings particles.

In FIG. 7, a first porosity model was trained and built using a first group of limestone cuttings particles (including 8,529 particles) having known porosity values. The model was generated as described above with respect to FIG. 5. In particular, 64 color and texture features were extracted from each labeled particle in the first group (by labeled it is meant that the particle was labeled with a known porosity). A machine learning algorithm (a regression model based on the open source LightGBM) was then used to generate a multi-dimensional correlation of the extracted features and the known porosity values. A second distinct group of limestone cuttings particles (including 4,594 different particles) having known porosity values was then tested to validate the model. These cuttings particles were obtained from 13 distinct core samples having known (measured) porosity values that ranged from about 0 to about 39 percent. Each core sample was crushed to generate simulated cuttings particles that were dispersed on a corresponding tray and prepared for image acquisition.

With continued reference to FIG. 7 a calibrated white light digital image was acquired of each tray of particles as described above with respect to FIG. 3. The digital images were segmented using the Mask R-CNN segmenting algorithm described above. The segmented images were evaluated particle by particle to extract 64 distinct color and texture features from each particle. The color and texture features were processed to determine a location of the particle in a 64-dimension feature space. These extracted features were then processed using the model to obtain a porosity value for each individual particle.

FIG. 7A depicts a plot of predicted porosity (using the method disclosed herein) versus ground truth porosity (the known porosity value of each particle) for each of the 4,594 evaluated particles. As depicted, there is significant particle to particle spread within each tray of particles. FIGS. 7B and 7C depict plots of predicted porosity versus ground truth porosity that plot the median porosity value of each tray of particles (7B) and the mean porosity value of each tray of particles (7C). As depicted, the median and mean values of each tray of particles closely match the ground truth (known) porosity values within an average error of 3.3 percent.

In FIG. 8, a second porosity model was trained and built using a first group of sandstone cuttings particles (including 14,209 particles) having known porosity values. The model was trained and built as described above with respect to FIG. 7. A second distinct group of sandstone cuttings particles (including 7,652 different particles) having known porosity values was then tested to validate the model. These cuttings particles were obtained from 19 distinct core samples having known (measured) porosity values that ranged from about 4 to about 30 percent. Each core sample was crushed to generate simulated cuttings particles that were dispersed on a corresponding tray and prepared for image acquisition.

With continued reference to FIG. 8 a calibrated white light digital image was acquired of each tray of particles as described above with respect to FIG. 3. The digital images were segmented using the Mask R-CNN segmenting algorithm described above. The segmented images were evaluated particle by particle to extract 64 distinct color and texture related features from each particle, thereby defining a 64-dimension feature space. These extracted features were then processed using the model to obtain a porosity value for each individual particle.

Figure 8A:
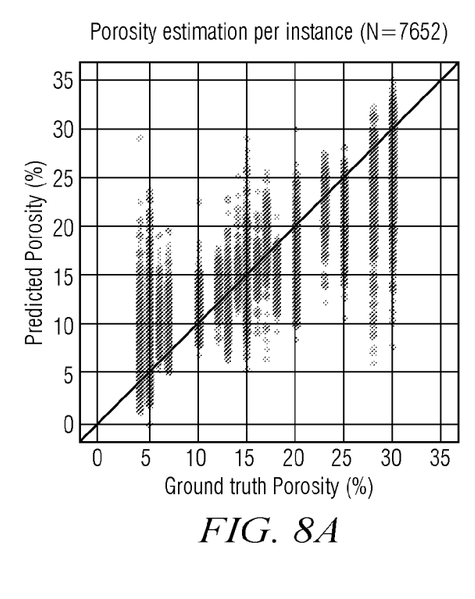
FIGS. 8A, 8B, and 8C (collectively FIG. 8) depict plots of predicted porosity versus ground truth porosity generated in a second porosity model validation test using sandstone cuttings particles.
Figure 8B:
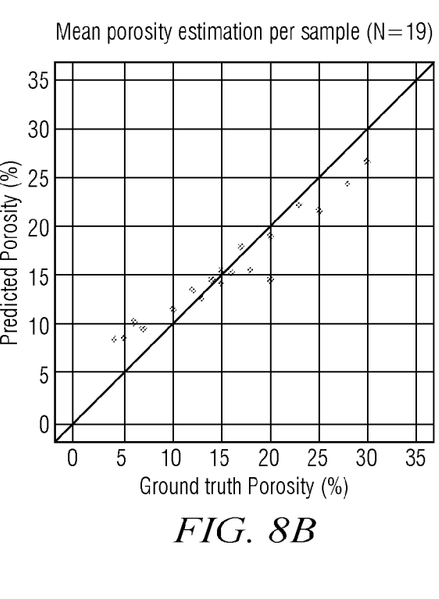
Figure 8C:
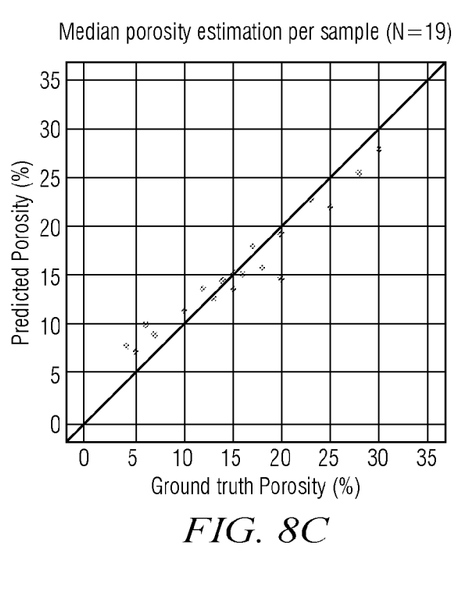

FIG. 8A depicts a plot of predicted porosity (using the method disclosed herein) versus ground truth porosity (the known porosity value of each particle) for each of the 7,652 evaluated particles. As depicted, there is significant particle to particle spread within each tray of particles. FIGS. 8B and 8C depict plots of predicted porosity versus ground truth porosity that plot the median porosity value of each tray of particles (8B) and the mean porosity value of each tray of particles (8C). As depicted, the median and mean values of each tray of particles closely match the ground truth (known) porosity values within an average error of 2.8 percent.

It will be understood that the present disclosure includes numerous embodiments. These embodiments include, but are not limited to, the following embodiments.

In a first embodiment, a method for estimating a porosity of a subterranean formation comprises acquiring a calibrated digital image of cuttings particles generated via drilling a wellbore in the subterranean formation; extracting a plurality of color and texture features from the calibrated digital image of the cuttings particles; and estimating the porosity of the subterranean formation using a model, wherein the model includes a correlation between the plurality of color and texture features and the porosity.

A second embodiment may include the first embodiment, wherein the acquiring the calibrated digital image comprises drilling a subterranean wellbore; collecting the cuttings particles from circulating drilling fluid; preparing the cuttings particles; and taking a calibrated digital photograph of the prepared cuttings particles.

A third embodiment may include any one of the first through second embodiments, further comprising segmenting the calibrated digital image to generate a segmented image that identifies individual cuttings particles of the cuttings particles depicted in the calibrated digital image, wherein the extracting comprises extracting a plurality of color and texture features corresponding to selected particles of the identified individual cuttings particles in the segmented image; and the estimating comprises estimating a porosity of each of the selected particles using the model and computing a mean or median value of the estimated porosity of each of the selected particles to estimate the porosity of the subterranean formation.

A fourth embodiment may include the third embodiment, wherein the segmenting, the extracting, and the estimating are performed automatically.

A fifth embodiment may include any one of the third through fourth embodiments, wherein the estimating the porosity of each of the selected particles using the model comprises determining a location of each of the selected particles in a multi-dimensional color and texture feature space; and estimating the porosity of each of the selected particles from the location of each of the selected particles in the multi-dimensional color and texture feature space.

A sixth embodiment may include any one of the third through fifth embodiments, wherein the estimating the porosity of each of the selected particles using the model comprises clustering each of the selected particles in a multi-dimensional color and texture feature space; and estimating the porosity of each of the selected particles from the clustering.

A seventh embodiment may include any one of the first through sixth embodiments, wherein the estimating the porosity of each of the selected particles using the model comprises labeling each of the identified cuttings particles in the segmented image with a corresponding lithology type based on the plurality of color and texture features; selecting the model from a plurality of models that corresponds to the labeled lithology type for each of the selected ones of the identified cuttings particles; and estimating the porosity of each of the selected particles using the selected model, wherein the selected model is configured to correlate the plurality of color and texture features with porosity for cutting particles of the labeled lithology type.

An eighth embodiment may include the seventh embodiment, wherein the cuttings particles comprise at least first and second distinct lithology types.

A ninth embodiment may include any one of the first through eighth embodiments, wherein the model is generated via acquiring a plurality of calibrated digital images of cuttings particles having known porosity values; labeling the cuttings particles having known porosity values with the corresponding known porosity values; extracting a plurality of color and texture features from the labeled cuttings particles; and determining a correlation between the plurality of extracted color and texture features and the porosity values to generate the model.

A tenth embodiment may include the ninth embodiment, wherein the determining a correlation comprises a nearest neighbor regression based on a distance between the cuttings particles having known porosity values in a multi-dimensional color and texture space.

An eleventh embodiment may include the ninth embodiment, wherein the determining a correlation comprises building and training the model using a machine learning model that determines which of the color and texture features best correlate with the known porosity values.

In a twelfth embodiment, a system for estimating a porosity of a subterranean formation comprises a digital camera system configured to take a calibrated digital image of rock particles from the subterranean formation; and a digital image processing system including a plurality of modules, the modules comprising a color and texture feature extraction module configured to extract color features and texture features from the calibrated digital image; and a porosity estimation module configured to estimate the porosity of the subterranean formation using a model that correlates the extracted color and texture features with porosity.

A thirteenth embodiment may include the twelfth embodiment, wherein the modules further comprise a segmentation module configured to process the calibrated digital image to identify individual cuttings particles in the calibrated digital image; a consolidation module configured to compute an average porosity value from estimated porosity values of selected ones of the identified cuttings particles; wherein the color and texture feature extraction module is configured to extract color features and texture features from the selected ones of the identified cuttings particles; and wherein the porosity estimation module is configured to estimate the porosity values of the selected ones of the identified cuttings particles using the model.

A fourteenth embodiment may include the thirteenth embodiment, wherein the porosity estimation module is configured to determine a location of each of the each of the selected ones of the identified cuttings particles in a multi-dimensional color and texture feature space; and estimate the porosity from the location of each of the selected ones of the identified cuttings particles in the multi-dimensional color and texture feature space.

A fifteenth embodiment may include the thirteenth embodiment, wherein the porosity estimation module is configured to cluster each of the selected ones of the identified cuttings particles in a multi-dimensional color and texture feature space; and estimate the porosity from the clustering.

In a sixteenth embodiment, a method for generating a model correlating color and texture features of rock particles with a known porosity of the rock particles comprising acquiring a plurality of calibrated digital images, each of which includes a plurality of rock particles having known porosity values; labeling the plurality of rock particles with the corresponding known porosity values; extracting a plurality of color and texture features from the labeled plurality of rock particles; and determining a correlation between the plurality of extracted color and texture features and the known porosity values and thereby generate the model.

A seventeenth embodiment may include the sixteenth embodiment, wherein the determining a correlation comprises a nearest neighbor regression based a distance between cuttings in a multi-dimensional color and texture space.

An eighteenth embodiment may include any one of the sixteenth through seventeenth embodiments, wherein the determining a correlation comprises building and training the model using a machine learning model that determines which of the color and texture features best correlate with the known porosity.

A nineteenth embodiment may include any one of the sixteenth through eighteenth embodiments, wherein the plurality of rock particles is acquired as cuttings particles while drilling a subterranean wellbore; and the known porosity values are obtained via porosity logging measurements made while drilling the subterranean wellbore or porosity measurements made on core samples obtained from the subterranean wellbore.

A twentieth embodiment may include any one of the sixteenth through nineteenth embodiments, further comprising acquiring another calibrated digital image of cuttings particles generated while drilling a subterranean wellbore, the cuttings particles having an unknown porosity; processing the other calibrated digital image to generate a segmented image that identifies individual ones of the cuttings particles depicted in the calibrated digital image; extracting a plurality of color and texture features from selected ones of the identified cuttings particles depicted in the segmented image; and estimating the unknown porosity of each of the selected ones of the identified cuttings particles using a model to evaluate the plurality of color and texture features from the selected ones of the identified cuttings particles.

In a twenty-first embodiment, a method for estimating a porosity of a rock sample includes acquiring a calibrated digital image of the rock sample; processing the digital image to extract color and texture features from the rock sample; and processing the extracted color features and texture features with a model to estimate the porosity of the rock sample, wherein the model correlates digital image color and texture features with porosity.

A twenty-second embodiment may include the twenty-first embodiment, wherein the rock sample comprises a core plug sample or a drill cuttings particle.

Although formation porosity estimation from digital images has been described in detail, it should be understood that various changes, substitutions and alternations can be made herein without departing from the spirit and scope of the disclosure as defined by the appended claims.

The invention claimed is:

1. A method for estimating a porosity of a subterranean formation, the method comprising:
   acquiring a calibrated digital image of cuttings particles generated via drilling a wellbore in the subterranean formation;
   extracting a plurality of color and texture features from the calibrated digital image of the cuttings particles; and
   estimating the porosity of the subterranean formation using a model, wherein the model includes a correlation between the plurality of color and texture features and the porosity, and wherein the model is generated via:
      acquiring a plurality of calibrated digital images of sample cuttings particles having known porosity values;
      labeling the sample cuttings particles having known porosity values with the corresponding known porosity values;
      extracting a plurality of reference color and texture features from the labeled sample cuttings particles; and
      determining a correlation between the plurality of extracted reference color and texture features and the known porosity values to generate the model.

2. The method of claim 1, wherein the acquiring the calibrated digital image comprises:
   drilling a subterranean wellbore;
   collecting the cuttings particles from circulating drilling fluid;
   preparing the cuttings particles; and
   taking a calibrated digital photograph of the prepared cuttings particles.

3. The method of claim 1, further comprising segmenting the calibrated digital image to generate a segmented image that identifies individual cuttings particles of the cuttings particles depicted in the calibrated digital image, wherein:
   the extracting the plurality of color and texture features from the calibrated digital image of the cuttings particles comprises extracting a plurality of color and texture features corresponding to selected particles of the identified individual cuttings particles in the segmented image; and
   the estimating comprises estimating a porosity of each of the selected particles using the model and computing a mean or median value of the estimated porosity of each of the selected particles to estimate the porosity of the subterranean formation.

4. The method of claim 3, wherein the segmenting, the extracting the plurality of color and texture features from the calibrated digital image of the cuttings particles, and the estimating are performed automatically.

5. The method of claim 3, wherein the estimating the porosity of each of the selected particles using the model comprises:
   determining a location of each of the selected particles in a multi-dimensional color and texture feature space; and estimating the porosity of each of the selected particles from the location of each of the selected particles in the multi-dimensional color and texture feature space.

6. The method of claim 3, wherein the estimating the porosity of each of the selected particles using the model comprises:
   clustering each of the selected particles in a multi-dimensional color and texture feature space; and
   estimating the porosity of each of the selected particles from the clustering.

7. The method of claim 3, wherein the estimating the porosity of each of the selected particles using the model comprises:
   labeling each of the selected particles of the identified individual cuttings particles in the segmented image with a corresponding lithology type based on the plurality of color and texture features corresponding to the selected particles;
   selecting the model from a plurality of models that correspond to the labeled lithology type for each of the selected particles of the identified individual cuttings particles; and
   estimating the porosity of each of the selected particles using the selected model, wherein the selected model is configured to correlate a plurality of color and texture features with porosity for cuttings particles of the labeled lithology type.

8. The method of claim 7, wherein the cuttings particles depicted in the calibrated digital image comprise at least first and second distinct lithology types.

9. The method of claim 1, wherein the determining the correlation comprises a nearest neighbor regression based on a distance between the sample cuttings particles having known porosity values in a multi-dimensional color and texture space.

10. The method of claim 1, wherein the determining the correlation comprises building and training the model using a machine learning model that determines which of the plurality of reference color and texture features best correlate with the known porosity values.

11. A system for estimating a porosity of a subterranean formation, the system comprising:
   a digital camera system configured to take a calibrated digital image of rock particles from the subterranean formation; and
   a digital image processing system including a plurality of modules, the modules comprising:
      a color and texture feature extraction module configured to extract color features and texture features from the calibrated digital image;
      a porosity estimation module configured to estimate the porosity of the subterranean formation using a model that correlates the extracted color and texture features with porosity;
      a segmentation module configured to process the calibrated digital image to identify individual cuttings particles in the calibrated digital image; and
      a consolidation module configured to compute an average porosity value from estimated porosity values of selected ones of the identified individual cuttings particles;
   wherein the color and texture feature extraction module is configured to extract color features and texture features from the selected ones of the identified individual cuttings particles; and
   wherein the porosity estimation module is configured to:
      estimate the porosity values of the selected ones of the identified individual cuttings particles using the model;
      determine a location of each of the selected ones of the identified individual cuttings particles in a multi-dimensional color and texture feature space; and
      estimate the porosity of the subterranean formation from the location of each of the selected ones of the identified individual cuttings particles in the multi-dimensional color and texture feature space.

12. A method for generating a model correlating color and texture features of sample rock particles with a known porosity of the sample rock particles, the method comprising:
   acquiring a plurality of calibrated digital images, each of which includes a plurality of rock particles having known porosity values;
   labeling the plurality of rock particles with the corresponding known porosity values;
   extracting a plurality of color and texture features from the labeled plurality of rock particles;
   determining a correlation between the plurality of extracted color and texture features and the known porosity values to thereby generate the model; and
   estimating a porosity value of a rock particle with an unknown porosity based on the model.

13. The method of claim 12, wherein the determining the correlation comprises a nearest neighbor regression based a distance between cuttings in a multi-dimensional color and texture space.

14. The method of claim 12, wherein the determining the correlation comprises building and training the model using a machine learning model that determines which of the plurality of color and texture features best correlate with the known porosity values.

15. The method of claim 12, wherein:
   the plurality of rock particles are acquired as cuttings particles while drilling a subterranean wellbore; and
   the known porosity values are obtained via porosity logging measurements made while drilling the subterranean wellbore or porosity measurements made on core samples obtained from the subterranean wellbore.

16. The method of claim 12, further comprising:
   acquiring another calibrated digital image of cuttings particles generated while drilling a subterranean wellbore, the cuttings particles having an unknown porosity;
   processing the other calibrated digital image to generate a segmented image that identifies individual ones of the cuttings particles depicted in the other calibrated digital image;
   extracting a plurality of color and texture features from selected ones of the identified individual cuttings particles depicted in the segmented image; and
   estimating the unknown porosity of each of the selected ones of the identified individual cuttings particles using the model to evaluate the plurality of color and texture features extracted from the selected ones of the identified individual cuttings particles.

17. A system for estimating a porosity of a subterranean formation, the system comprising:
   a digital camera system configured to take a calibrated digital image of rock particles from the subterranean formation; and
   a digital image processing system including a plurality of modules, the modules comprising:

a color and texture feature extraction module configured to extract color features and texture features from the calibrated digital image;

a porosity estimation module configured to estimate the porosity of the subterranean formation using a model that correlates the extracted color features and texture features with porosity;

a segmentation module configured to process the calibrated digital image to identify individual cuttings particles in the calibrated digital image; and a consolidation module configured to compute an average porosity value from estimated porosity values of selected ones of the identified individual cuttings particles;

wherein the color and texture feature extraction module is configured to extract color features and texture features from the selected ones of the identified individual cuttings particles; and wherein the porosity estimation module is configured to:
  estimate the porosity values of the selected ones of the identified individual cuttings particles using the model;
  cluster each of the selected ones of the identified individual cuttings particles in a multi-dimensional color and texture feature space; and
  estimate the porosity of the subterranean formation from the clustering.

* * * * *